US012781107B2

(12) United States Patent
Saito

(10) Patent No.: US 12,781,107 B2
(45) Date of Patent: Nov. 3, 2026

(54) RESIN COMPOSITION, ADHESIVE MEMBER, AND DISPLAY DEVICE INCLUDING THE ADHESIVE MEMBER

(71) Applicant: Samsung Display Co., Ltd., Yongin-si (KR)

(72) Inventor: Yosuke Saito, Yokohama (JP)

(73) Assignee: Samsung Display Co., Ltd., Yongin-si (KR)

( * ) Notice: Subject to any disclaimer, the term of this patent is extended or adjusted under 35 U.S.C. 154(b) by 284 days.

(21) Appl. No.: 18/512,343

(22) Filed: Nov. 17, 2023

(65) Prior Publication Data

US 2024/0263054 A1 Aug. 8, 2024

(30) Foreign Application Priority Data

Jan. 30, 2023 (KR) ........................ 10-2023-0011654

(51) Int. Cl.

*C09J 11/06* (2006.01)
*C08L 33/08* (2006.01)
*C09J 11/08* (2006.01)
*C09J 133/08* (2006.01)

(52) U.S. Cl.

CPC ............. *C09J 133/08* (2013.01); *C08L 33/08* (2013.01); *C09J 11/06* (2013.01); *C09J 11/08* (2013.01); *C09J 2203/318* (2013.01); *C09J 2301/416* (2020.08); *Y10T 428/2891* (2015.01)

(58) Field of Classification Search

None
See application file for complete search history.

(56) References Cited

U.S. PATENT DOCUMENTS 9,109,137 B2 8/2015 Lindekens et al.
10,266,733 B2 4/2019 Liu et al.
10,927,269 B2 2/2021 Graunke et al.
11,427,739 B2 8/2022 Shah et al.
12,252,569 B2 * 3/2025 Morita .................. C08F 220/14
2019/0177459 A1 * 6/2019 Kim ........................ B32B 9/002
2021/0349242 A1 11/2021 Yoo et al.
2022/0177626 A1 6/2022 Fujiwara
2022/0204672 A1 * 6/2022 Morita ............... C08G 18/7621
2024/0218105 A1 * 7/2024 Saito ......................... B32B 7/12
2024/0240054 A1 * 7/2024 Saito ......................... B32B 7/12

FOREIGN PATENT DOCUMENTS

JP 2012-237965 12/2012
JP 6481167 3/2019
JP 6696970 5/2020
JP 2020-525620 8/2020
JP 6783995 11/2020
JP 2021-508755 3/2021
JP 7120518 8/2022
KR 10-2015-0002635 1/2015
KR 10-2229361 3/2021
KR 10-2022-0082131 6/2022
WO 2016/025965 2/2016
WO 2019/133580 7/2019
WO 2020/076053 4/2020

OTHER PUBLICATIONS

English translation of KR 1020170115227 , Oct. 17, 2027 (Year: 2017).*
English translation of KR102229361, Mar. 12, 2021 (Year: 2021).*

* cited by examiner

*Primary Examiner* — Anish P Desai
(74) *Attorney, Agent, or Firm* — Lerner David LLP

(57) ABSTRACT

Embodiments provide a resin composition, an adhesive member including a polymer derived from the resin composition, and a display device including the adhesive member. The resin composition includes a (meth)acrylate polymer that is synthesized with a first monomer, a photoinitiator, a (meth)acrylate monomer, and a urethane (meth)acrylate oligomer. An end group of the (meth)acrylate polymer includes a (meth)acrylate group, and the first monomer is represented by Formula 1, which is explained in the specification:

[Formula 1]

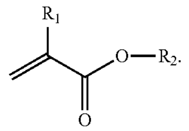

16 Claims, 8 Drawing Sheets

RESIN COMPOSITION, ADHESIVE MEMBER, AND DISPLAY DEVICE INCLUDING THE ADHESIVE MEMBER

CROSS-REFERENCE TO RELATED APPLICATION(S)

This application claims priority to and benefits of Korean Patent Application No. 10-2023-0011654 under 35 U.S.C. § 119, filed on Jan. 30, 2023, in the Korean Intellectual Property Office, the entire contents of which are incorporated herein by reference.

BACKGROUND

1. Technical Field

The disclosure relates to a resin composition, an adhesive member formed from the resin composition, and a display device including the adhesive member.

2. Description of the Related Art

Display devices are used in various multimedia devices such as televisions, mobile phones, tablet computers, and game consoles in order to provide image information to a user. Current development is directed to various flexible display devices which are foldable, bendable, or rollable. Flexible display devices are required to have proven reliability in being folded, bent, or rolled.

A display device is composed of multiple members and includes an adhesive layer for attaching the members together. The adhesive layer may be applied to display devices in various forms, and may be formed by applying an adhesive resin composition through an inkjet method.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a resin composition having excellent discharge stability and excellent adhesive strength.

The disclosure also provides an adhesive member having excellent adhesive strength.

The disclosure also provides a display device including the adhesive member having excellent adhesive strength, thereby having excellent reliability in various operations.

An embodiment provides a resin composition which may include a (meth)acrylate polymer synthesized with a first monomer, a photoinitiator, a (meth)acrylate monomer containing a (meth)acryloyl group, and a urethane (meth)acrylate oligomer, wherein an end group of the (meth)acrylate polymer (A) may include a (meth)acrylate group, and the first monomer may be represented by Formula 1:

[Formula 1]

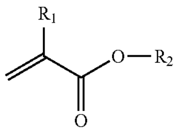

In Formula 1, $R_1$ may be a hydrogen atom or a substituted or unsubstituted methyl group, and $R_2$ may be a substituted or unsubstituted linear alkyl group having 1 to 20 carbon atoms or a substituted or unsubstituted branched alkyl group having 1 to 20 carbon atoms.

In an embodiment, in Formula 1, $R_1$ may be an unsubstituted methyl group, and $R_2$ may be an unsubstituted methyl group, an unsubstituted 2-ethylhexyl group, or an unsubstituted dodecyl group.

In an embodiment, the first monomer may include methyl (meth)acrylate, 2-ethylhexyl (meth)acrylate, or dodecyl (meth)acrylate.

In an embodiment, the (meth)acrylate polymer may be synthesized with the first monomer and a second monomer that is different from the first monomer.

In an embodiment, the first monomer may include methyl (meth)acrylate, and the second monomer may include 2-ethylhexyl (meth)acrylate or dodecyl (meth)acrylate.

In an embodiment, the (meth)acrylate polymer may have a weight average molecular weight in a range of about 4,000 to about 20,000.

In an embodiment, an amount of the (meth)acrylate polymer may be in a range of about 1 wt % to about 20 wt %, with respect to a total weight of the resin composition.

In an embodiment, an amount of the photoinitiator may be in a range of about 1 wt % to about 5 wt %, with respect to a total weight of the resin composition.

In an embodiment, an amount of the (meth)acrylate monomer may be in a range of about 75 wt % to about 90 wt %, with respect to a total weight of the resin composition.

In an embodiment, an amount of the urethane (meth) acrylate oligomer may be in a range of about 1 wt % to about 20 wt %, with respect to a total weight of the resin composition.

In an embodiment, the resin composition may have a shear viscosity in a range of about 8 mPa·s to about 50 mPa·s, at about 25° C.

In an embodiment, the photoinitiator may include a radical polymerization initiator.

An embodiment provides an adhesive member which may include a polymer derived from a resin composition, wherein

- the adhesive member may have a 180° peel strength equal to or greater than about 100 gf/25 mm at about 60° C. to a polyethylene terephthalate (PET) film and glass, and
- the resin composition may include: a (meth)acrylate polymer containing a linear or branched alkyl group at a main chain or a side chain and a (meth)acrylate group at an end group;
- a photoinitiator; a (meth)acrylate monomer containing a (meth)acryloyl group; and a urethane (meth)acrylate oligomer.

In an embodiment, the polymer may be obtained by photo-curing the resin composition.

In an embodiment, the adhesive member may have a storage modulus equal to or less than about 0.2 MPa, at about −20° C.

In an embodiment, with respect to a total weight of the resin composition, an amount of the (meth)acrylate polymer may be in a range of about 1 wt % to about 20 wt %, and an amount of the (meth)acrylate monomer may be in a range of about 75 wt % to about 90 wt %.

An embodiment provides a display device which may include a display panel, a window disposed on the display panel; and an adhesive member disposed between the display panel and the window, wherein the adhesive member may be derived from a resin composition; the resin composition may include a (meth)acrylate polymer synthesized with a first monomer, a photoinitiator, a (meth)acrylate monomer containing a (meth)acryloyl group, and a urethane (meth)acrylate oligomer; an end group of the (meth)acrylate polymer may include a (meth)acrylate group; and the first monomer may be represented by Formula 1:

[Formula 1]

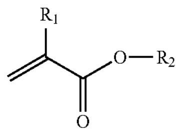

In Formula 1, $R_1$ may be a hydrogen atom or a substituted or unsubstituted methyl group, and $R_2$ may be a substituted or unsubstituted linear alkyl group having 1 to 20 carbon atoms or a substituted or unsubstituted branched alkyl group having 1 to 20 carbon atoms.

In an embodiment, the adhesive member may be formed by:

directly providing the resin composition on a surface of the window or on a surface of the display panel; and UV curing the provided resin composition.

In an embodiment, the display device may further include an input sensing unit disposed on the display panel, wherein the adhesive member may be disposed between the display panel and the input sensing unit or between the input sensing unit and the window.

In an embodiment, the display panel may include a display element layer and an encapsulation layer disposed on the display element layer; the input sensing unit may be directly disposed on the encapsulation layer; and the adhesive member may be disposed on the input sensing unit.

It is to be understood that the embodiments above are described in a generic and explanatory sense only and not for the purposes of limitation, and the disclosure is not limited to the embodiments described above.

BRIEF DESCRIPTION OF THE DRAWINGS

The accompanying drawings are included to provide a further understanding of the embodiments, and are incorporated in and constitute a part of this specification. The drawings illustrate embodiments of the disclosure and principles thereof. The above and other aspects and features of the disclosure will become more apparent by describing in detail embodiments thereof with reference to the accompanying drawings, in which.

DETAILED DESCRIPTION OF THE EMBODIMENTS

Figure 1:
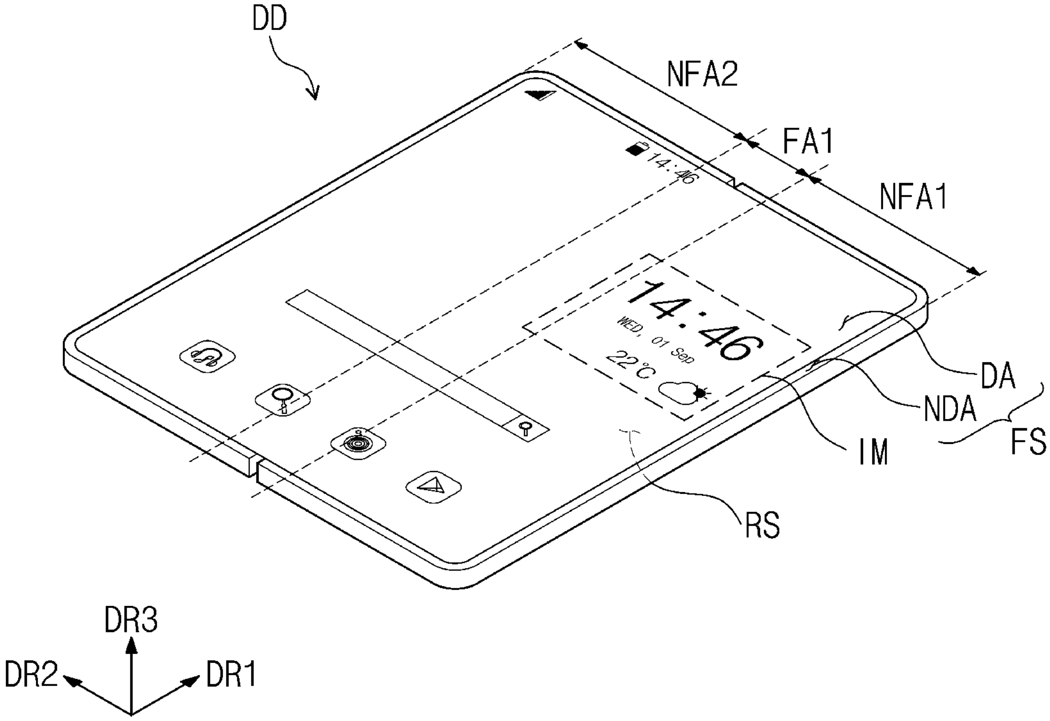
FIG. 1 is a schematic perspective view of a display device in an unfolded state according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, the sizes, thicknesses, ratios, and dimensions of the elements may be exaggerated for ease of description and for clarity. Like reference numbers and reference characters refer to like elements throughout.

In the specification, it will be understood that when an element (or region, layer, part, etc.) is referred to as being "on", "connected to", or "coupled to" another element, it can be directly on, connected to, or coupled to the other element, or one or more intervening elements may be present therebetween. In a similar sense, when an element (or region, layer, part, etc.) is described as "covering" another element, it can directly cover the other element, or one or more intervening elements may be present therebetween.

In the specification, when an element is "directly on," "directly connected to," or "directly coupled to" another element, there are no intervening elements present. For example, "directly on" may mean that two layers or two elements are disposed without an additional element such as an adhesion element therebetween.

As used herein, the expressions used in the singular such as "a," "an," and "the," are intended to include the plural forms as well, unless the context clearly indicates otherwise.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or".

In the specification and the claims, the term "at least one of" is intended to include the meaning of "at least one selected from the group consisting of" for the purpose of its meaning and interpretation. For example, "at least one of A, B, and C" may be understood to mean A only, B only, C only, or any combination of two or more of A, B, and C, such as ABC, ACC, BC, or CC. When preceding a list of elements, the term, "at least one of," modifies the entire list of elements and does not modify the individual elements of the list.

It will be understood that, although the terms first, second, etc. may be used herein to describe various elements, these elements should not be limited by these terms. These terms are only used to distinguish one element from another element. Thus, a first element could be termed a second element without departing from the teachings of the disclosure. Similarly, a second element could be termed a first element, without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "about" or "approximately" as used herein is inclusive of the stated value and means within an acceptable range of deviation for the recited value as determined by one of ordinary skill in the art, considering the measurement in question and the error associated with measurement of the recited quantity (i.e., the limitations of the measurement system). For example, "about" may mean within one or more standard deviations, or within +20%, +10%, or +5% of the stated value.

It should be understood that the terms "comprises," "comprising," "includes," "including," "have," "having," "contains," "containing," and the like are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, a display device according to an embodiment and a method for manufacturing the display device will be described with reference to the accompanying drawings.

Figure 2A:
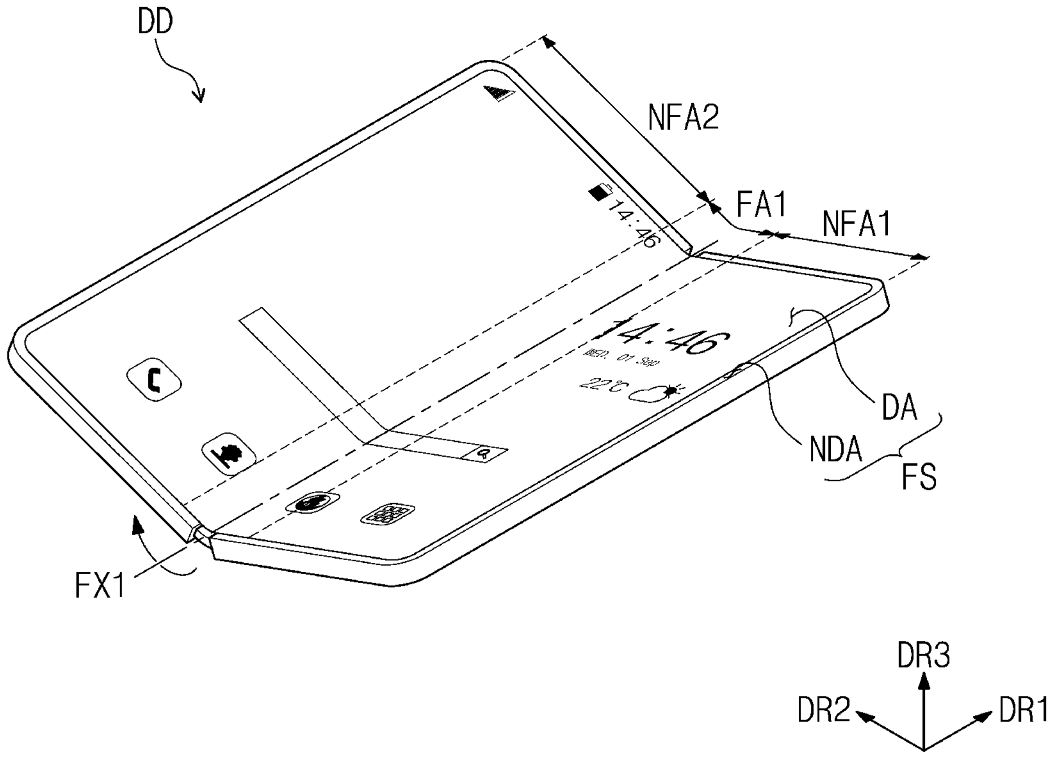
FIG. 2A is a schematic perspective view of a display device during an inward folding process according to an embodiment.
Figure 2B:
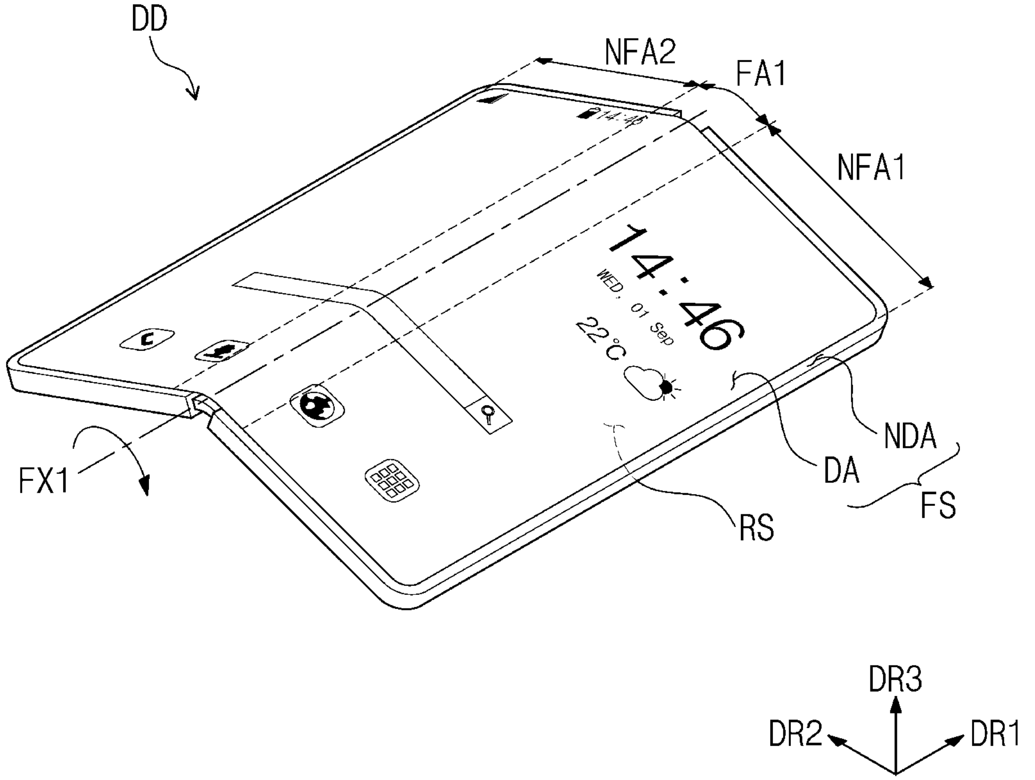
FIG. 2B is a schematic perspective view of a display device during an outward folding process according to an embodiment.

FIG. 1 is a schematic perspective view of a display device DD in an unfolded state according to an embodiment. FIG. 2A is a schematic perspective view of the display device DD during an inward folding process according to an embodiment. FIG. 2B is a schematic perspective view of the display device DD during an outward folding process according to an embodiment.

The display device DD according to an embodiment illustrated in FIG. 1 may be a device activated by an electrical signal. For example, the display device DD may be a mobile phone, a tablet, a monitor, a television, a car navigation device, a game console, or a wearable device, but embodiments are not limited thereto. FIG. 1 illustrates a mobile phone as an example of the display device DD. The display device DD according to an embodiment may be a flexible display device which is foldable, bendable, or rollable.

FIG. 1 and the drawings below illustrate a first direction DR1, a second direction DR2, and a third direction DR3. The directions indicated by the first direction DR1, the second direction DR2, and the third direction DR3 described in the specification are relative terms and may be converted into other directions. In the specification, the first direction DR1 and the second direction DR2 may be orthogonal to each other, and the third direction DR3 may be a normal direction with respect to a plane defined by the first direction DR1 and the second direction DR2.

In the specification, the display device DD may have a thickness direction that is parallel to the third direction DR3, which is a normal direction with respect to a plane defined by the first direction DR1 and the second direction DR2. A front surface (or a top surface) and a rear surface (or a bottom surface) of each of members constituting the display device DD may be defined on the basis of the third direction DR3.

In the specification, the term "in a plane" may be interpreted as viewing in a plane that is parallel to a plane defined by the first direction DR1 and the second direction DR2.

Referring to FIG. 1, the display device DD may display an image IM through a display surface FS. The display surface FS may include a display region DA and a non-display region NDA. The display region DA may be a region that is activated by an electrical signal. The display device DD may display an image IM through a display region DA. The display device DD may detect various forms of external inputs in the display region DA. The non-display region NDA may be adjacent to the display region DA. The non-display region NDA may surround the display region DA. Thus, a shape of the display region DA may be substantially defined by the non-display region NDA. However, this is only an example. In an embodiment, the non-display region NDA may be disposed adjacent to only one side of the display region DA, or the non-display region NDA may be omitted. The display surface FS may include a plane that is defined by the first direction DR1 and the second direction DR2.

A rear surface RS of the display device DD may face the display surface FS. For example, the rear surface RS may be an external surface of the display device DD, and may not display a video or an image. In another embodiment, the rear surface RS may function as a second display surface which displays a video or an image.

The display device DD may be divided into a folding region FA1 and non-folding regions NFA1 and NFA2. Multiple non-folding regions NFA1 and NFA2 may be defined in the display device DD. A first non-folding region NFA1 and a second non-folding region NFA2 may be spaced apart from each other, with the folding region FA1 interposed therebetween.

FIGS. 1 to 2B, the display device DD is shown to include one folding region FA1, but this is only an example, and multiple folding regions may be defined in the display device DD. In an embodiment, the display device DD may be folded with respect to multiple folding axes, so that portions of the display surface FS may face each other. The number of folding axes and the resulting number of the non-folding regions included in the display device DD are not limited to any one embodiment.

Referring to FIGS. 2A and 2B, the display device DD may be folded with respect to a first folding axis FX1. The first folding axis FX1 illustrated in FIGS. 2A and 2B is an imaginary axis extending in the first direction DR1, and the first folding axis FX1 may be parallel to the longer sides of the display device DD. However, this is only an example, and the direction in which the first folding axis FX1 extends is not limited to the first direction DR1.

The first folding axis FX1 may extend along the first direction DR1 on the display surface FS, or may extend along the first direction DR1 on the rear surface RS. Referring to FIG. 2A, a first non-folding region NFA1 and a second non-folding region NFA2 may face each other, and the display device DD may be folded inward so that the display surface FS is not exposed to the outside. Referring to FIG. 2B, the display device DD may be folded with respect to the first folding axis FX1 into an outward-folded state in which a region of the rear surface RS that overlaps the first non-folding region NFA1 and another region of the rear surface RS that overlaps the second non-folding region NFA2 may face each other.

Figure 3:
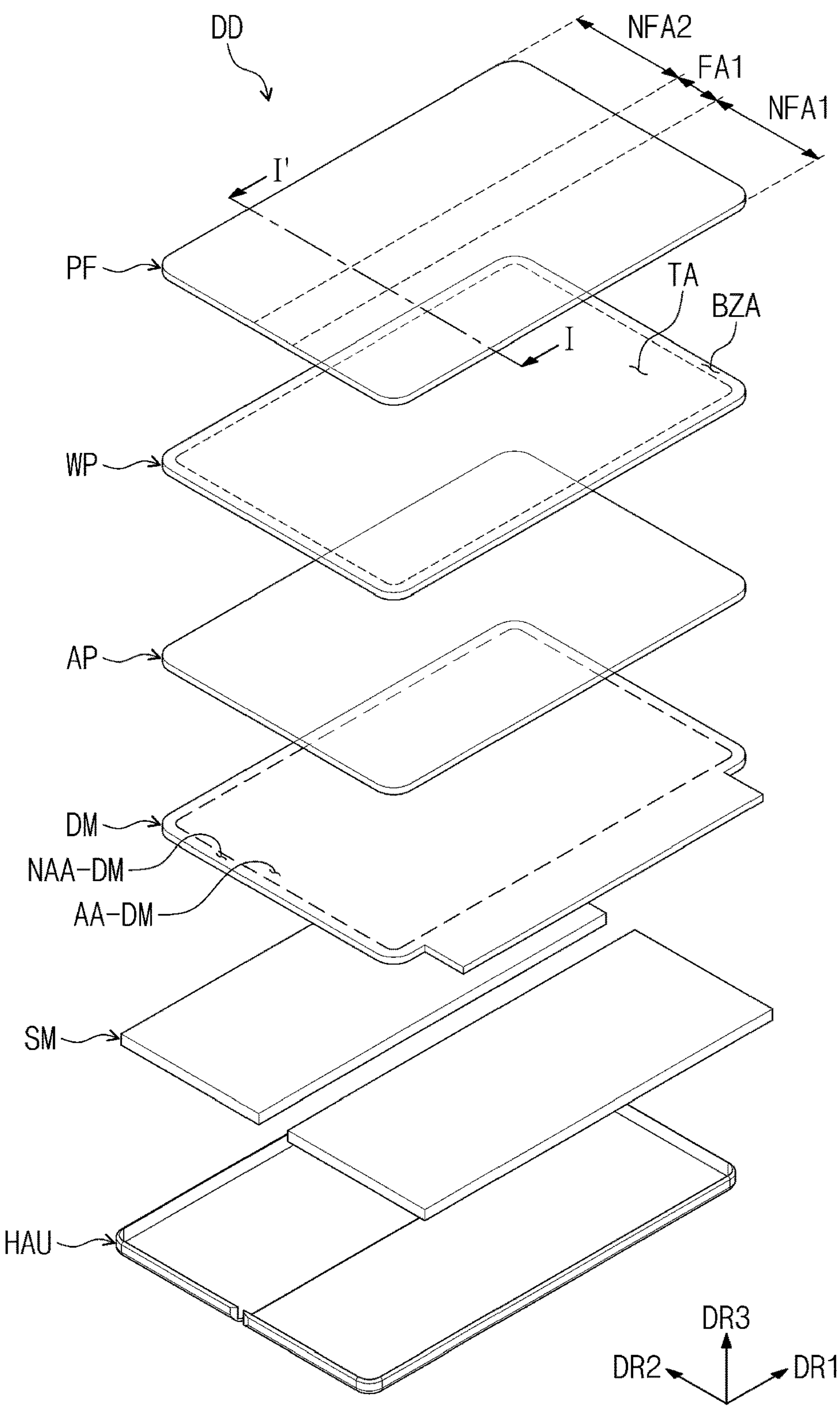
FIG. 3 is an exploded schematic perspective view of a display device according to an embodiment.

FIG. 3 is an exploded schematic perspective view of a display device DD according to an embodiment.

Referring to FIG. 3, the display device DD includes a display module DM, a window WP disposed on the display module DM, and an adhesive member AP disposed between the display module DM and the window WP. The display device DD may further include a support member SM disposed on a lower portion of the display module DM, a protective layer PF disposed on the window WP, and a housing HAU which accommodates the display module DM, the support member SM, or the like.

The housing HAU may include a material having a relatively high rigidity. For example, the housing HAU may include frames and/or plates formed of glass, plastic, or metals. The housing HAU may provide an accommodating space to receive various components of the display device DD. The display module DM may be received in the accommodating space and may be protected from an external impact.

The support member SM may include a metal material or a polymer material. For example, the support member SM may include stainless steel, aluminum, or an alloy thereof. As another example, the support member SM may include carbon fiber reinforced plastic (CFRP) or the like. However, embodiments are not limited thereto, and the support member SM may include a non-metal material, plastic, glass fiber reinforced plastic, or glass.

Although not shown in the drawings, the display device DD may further include a cushion layer, a shielding layer, or the like that is disposed on a lower portion of the support member SM. The cushion layer may include an elastomer such as a sponge, a foam, or a urethane resin. The shielding layer may be an electromagnetic wave shielding layer or a heat dissipating layer.

The display module DM may be activated by an electrical signal. The display module DM may be activated to display an image IM (see FIG. 1) in the display region DA (see FIG. 1) of the display device DD. An active region AA-DM and a peripheral region NAA-DM may be defined in the display module DM. The active region AA-DM may be a region that is activated by an electrical signal. The peripheral region NAA-DM may be a region that is adjacent to at least one side of the active region AA-DM. A circuit or a wiring for driving the active region AA-DM may be disposed in the peripheral region NAA-DM.

An adhesive member AP may be disposed on the display module DM. The display module DM and the window WP may be attached to each other by the adhesive member AP. The adhesive member AP may be optically clear. The adhesive member AP according to an embodiment may include a polymer derived from a resin composition RC (see FIGS. 5A and 6A) according to an embodiment. The adhesive member AP may be formed from the resin composition RC (see FIGS. 5A and 6A) according to an embodiment. The adhesive member AP formed from the resin composition RC (see FIGS. 5A and 6A) according to an embodiment may exhibit excellent adhesive reliability. In an embodiment, the display device DD including the adhesive member AP formed from the resin composition RC (see FIGS. 5A and 6A) may exhibit excellent reliability in an operation state such as folding, bending, or rolling.

The window WM may include a glass substrate. The window WP may protect the display module DM, or the like. An image IM (see FIG. 1) that is generated from the display module DM may be transmitted through the window WP and provided to a user. For example, the window WP may include ultra-thin glass (UTG).

The window WP may include a transmission region TA and a bezel region BZA. The transmission region TA may overlap at least a portion of the active region AA-DM of the display module DM. The transmission region TA may be an optically clear region. An image IM (see FIG. 1) may be provided to a user through the transmission region TA.

The bezel region BZA may have a light transmittance that is relatively lower than that of the transmission region TA. The bezel region BZA may define a shape of the transmission region TA. The bezel region BZA may be adjacent to the transmission region TA, and may surround the transmission region TA.

The bezel region BZA may have a selected color. The bezel region BZA may cover the peripheral region NAA-DM of the display module DM to prevent the peripheral region NAA-DM from being viewed from the outside. However, embodiments are not limited thereto, and the bezel region BZA may be disposed adjacent to only one side of the transmission region TA, or at least a portion thereof may be omitted.

The protective layer PF may be a functional layer that protects a surface (e.g., an upper surface) of the window WP. The protective layer PF may include an anti-fingerprint coating material, a hard coating material, an antistatic material, or the like. Although not shown in the drawings, an auxiliary adhesive layer may be disposed between the window WP and the protective layer PF. Although not shown in FIG. 3, in an embodiment, the protective layer PF may be omitted.

Figure 4:
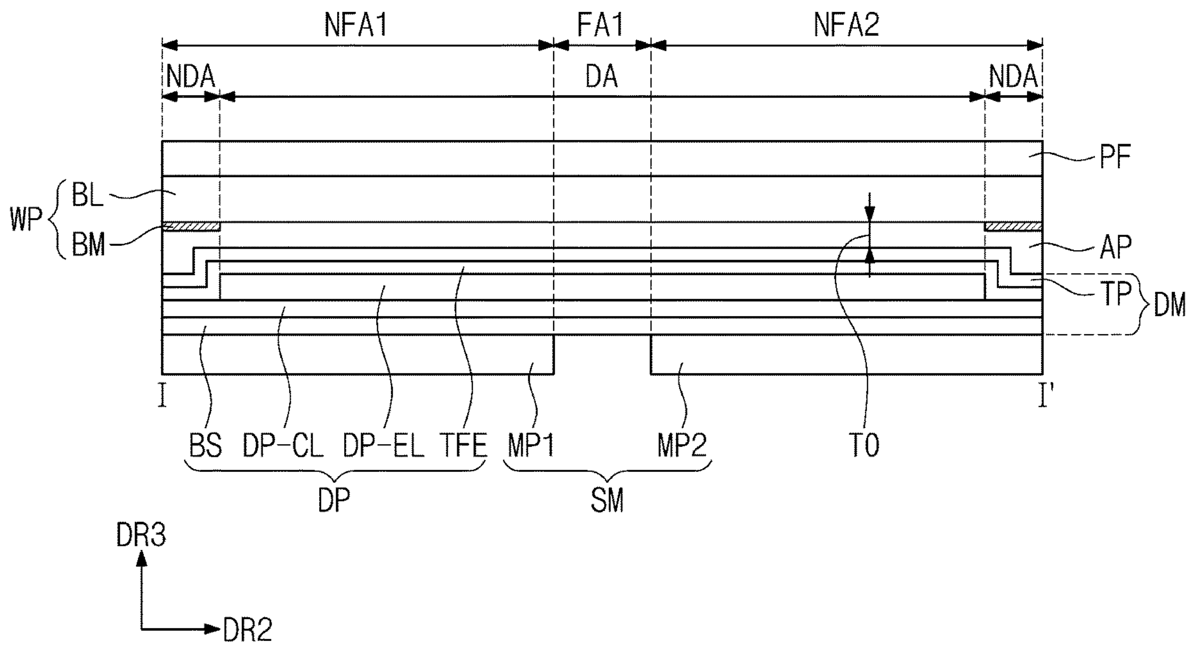
FIG. 4 is a schematic cross-sectional view of a display device according to an embodiment.

FIG. 4 is a schematic cross-sectional view of a display device DD according to an embodiment. FIG. 4 is a schematic cross-sectional view illustrating a part taken along line I-I' in FIG. 3.

FIG. 4 illustrates the support member SM, the display module DM, the adhesive member AP, the window WP, and the protective layer PF, with the housing HAU omitted, for convenience of description.

Referring to FIG. 4, the support member SM may include a first support part MP1 that overlaps the first non-folding region NFA1 and a second support part MP2 that overlaps the second non-folding region NFA2. The first support part MP1 and the second support part MP2 may be spaced apart from each other with the folding region FA1 therebetween. The first support part MP1 and the second support part MP2 may not overlap the folding region FA1. Although not shown in FIG. 4, in an embodiment, at least a part of the first support part MP1 and at least a part of the second support part MP2 may overlap the folding region FA1.

The display module DM may include a display panel DP and an input sensing unit TP that is disposed on the display panel DP. The display panel DP may include a base substrate BS, a circuit layer DP-CL disposed on the base substrate BS, a display element layer DP-EL disposed on the circuit layer DP-CL, and an encapsulation layer TFE disposed on and covering the display element layer DP-EL.

The configuration of the display panel DP illustrated in FIG. 4 is only an example, and the configuration of the display panel DP is not limited thereto. For example, the display panel DP may include a liquid crystal display element, and the encapsulation layer TFE may be omitted.

The base substrate BS may provide a base surface on which the circuit layer DP-CL is disposed. The base substrate BS may be a flexible substrate that is bendable, foldable, or rollable. The base substrate BS may be a glass substrate, a metal substrate, or a polymer substrate. However, embodiments are not limited thereto, and the base substrate BS may include an inorganic layer, an organic layer, or a composite material layer.

The circuit layer DP-CL may include an insulation layer, a semiconductor pattern, a conductive pattern, a signal line, etc. For example, the circuit layer DP-CL may include a switching transistor and a driving transistor for driving a light emitting element (not shown) in the display element layer DP-EL.

The display element layer DP-EL may include a light emitting element (not shown) that emits light. For example, the light emitting element may be an organic light emitting element, an inorganic light emitting element, an organic-inorganic light emitting element, a micro LED, a nano LED, a quantum dot light emitting element, an electrophoretic element, an electrowetting element, or the like.

The encapsulation layer TFE may be disposed on an upper portion of the display element layer DP-EL. The encapsulation layer TFE may protect the display element layer DP-EL from foreign substances such as moisture, oxygen, and/or dust particles. The encapsulation layer TFE may include at least one inorganic layer. In an embodiment, the encapsulation layer TFE may include at least one organic layer and at least one inorganic layer. For example, the encapsulation layer TFE may include an inorganic layer, an organic layer, and another inorganic layer, which may be stacked in this order, but embodiments are not limited thereto.

The input sensing unit TP may be disposed on the display panel DP. For example, the input sensing unit TP may be directly disposed on the encapsulation layer TFE of the display panel DP. The input sensing unit TP may detect an external input, convert the external input into an input signal, and provide the input signal to the display panel DP. For example, in the display device DD according to an embodiment, the input sensing unit TP may be a touch sensing unit that senses a touch. The input sensing unit TP may recognize a user's direct touch, a user's indirect touch, a direct touch of an object, or an indirect touch of an object.

The input sensing unit TP may sense at least one of a location of an externally applied touch and a force (pressure) of an externally applied touch. In an embodiment, the input sensing unit TP may include various structures or may be formed of various materials, and is not limited to any one embodiment. The input sensing unit TP may include sensing electrodes (not shown) so as to sense an external input. The sensing electrodes (not shown) may sense an external input in a capacitive manner. The display panel DP may receive an input signal from the input sensing unit TP, and may generate an image according to the input signal.

The window WP may include a base layer BL and a printed layer BM. In an embodiment, the base layer BL may be a glass substrate. In another embodiment, the base layer BL may be a plastic substrate. For example, the base layer BL may include polyimide, polyacrylate, polymethylmethacrylate, polycarbonate, polyethylene naphthalate, polyvinylidene chloride, polyvinylidene difluoride, polystyrene, an ethylene vinyl alcohol copolymer, or a combination thereof.

The printed layer BM may be disposed on a surface of the base layer BL. The printed layer BM may be provided on at least a portion of a bottom surface of the base layer BL that is adjacent to the display module DM. The printed layer BM may be disposed on an edge area of the base layer BL. The printed layer BM may be an ink printed layer. The printed layer BM may be a layer that includes a pigment or a dye. In the window WP, the bezel region BZA may be a portion where the printed layer BM is provided.

The adhesive member AP may be disposed between the display module DM and the window WP. A thickness TO of the adhesive member AP may be in a range of about 50 μm to about 200 μm. For example, the thickness TO of the adhesive member AP may be in a range of about 50 μm to about 100 μm. However, this is only an example, and the thickness TO of the adhesive member AP is not limited thereto.

The adhesive member AP according to an embodiment may include a polymer that is derived from a resin composition RC (see FIG. 5A) according to an embodiment. The resin composition RC (see FIG. 5A) may include at least one (meth)acrylate polymer, at least one photoinitiator, at least one (meth)acrylate monomer, and at least one urethane (meth)acrylate oligomer. The (meth)acrylate polymer may contain a (meth)acrylic group at an end group thereof, and a linear or branched alkyl group at a main chain or a side chain thereof. The resin composition RC (see FIGS. 5A and 6A) according to an embodiment will be described in detail later.

The adhesive member AP of an embodiment has a high peel strength value in a humid heat environment as described later, and thus may exhibit excellent adhesive reliability and excellent folding reliability. In the specification, a humid heat environment may describe an environment having a high temperature and high humidity. The adhesive member AP may not peel off from an adherend (e.g., the display module DM or the window WP) even in a humid heat environment, and operations such as folding and unfolding may be readily performed. For example, the display device DD including the adhesive member AP may exhibit excellent reliability in an operation state such as folding or unfolding.

Figure 5A:
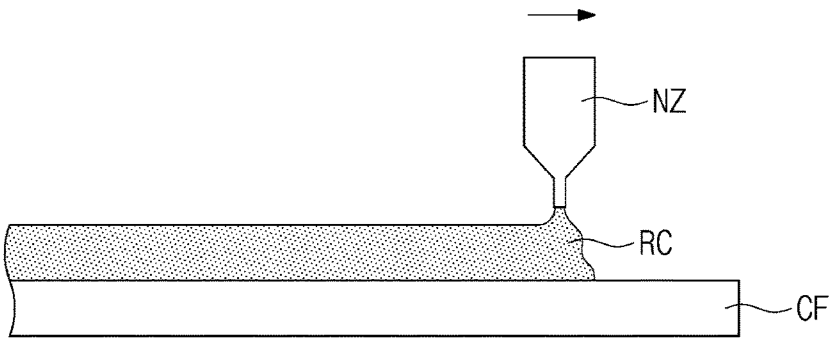
FIGS. 5A to 5C are each a schematic cross-sectional view of steps of a method for manufacturing an adhesive member according to an embodiment.
Figure 5B:
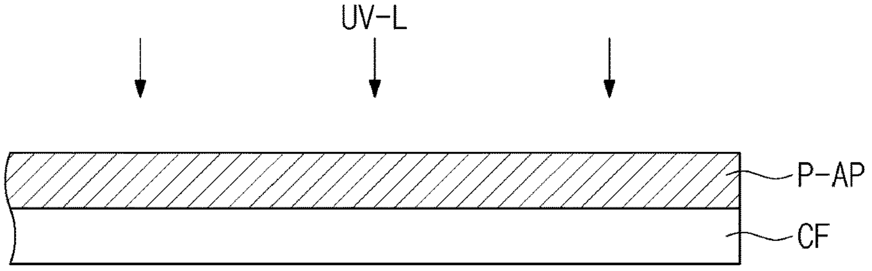
Figure 5C:
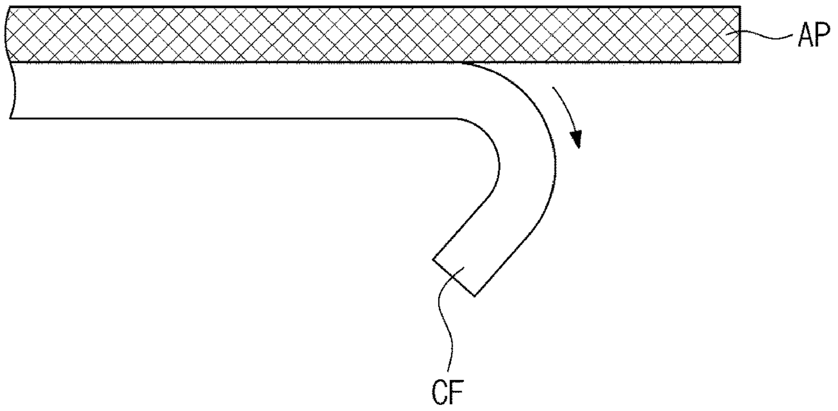

FIGS. 5A to 5C are each a schematic cross-sectional view of steps of a method for manufacturing an adhesive member AP according to an embodiment.

A method for manufacturing an adhesive member AP according to an embodiment may include providing a resin composition RC on a substrate CF, providing light to a preliminary adhesive member P-AP to form the adhesive member AP, and detaching the adhesive member AP from the substrate CF.

FIG. 5A is a schematic cross-sectional view that shows the resin composition RC bring provided on the substrate CF. Referring to FIG. 5A, the resin composition RC may be applied (e.g., directly applied) on the substrate CF. The resin composition RC may be provided on the substrate CF through a nozzle NZ. For example, the substrate CF on which the resin composition RC is provided may include polyethylene terephthalate (PET). The substrate CF is a temporary substrate that is used for forming the adhesive member AP from the resin composition RC. Thus, the substrate CF may be used without limitation as long as it may be readily detached from the adhesive member AP after the curing of the resin composition RC. Release treatment may be conducted on a surface of the substrate CF on which the resin composition RC is provided.

The resin composition RC may be provided by an inkjet printing method or by a dispensing method. The resin composition according to an embodiment may have a shear viscosity in a range of about 8 mPa·s to about 50 mPa·s. In an embodiment, the shear viscosity may be measured according to a JIS Z8803 method. The shear viscosity may be measured at about 25° C. and about 10 rpm. The resin composition RC having a shear viscosity within the above range may exhibit excellent discharge stability. Thus, the resin composition RC having a shear viscosity within the above range may be smoothly discharged from a device such as a nozzle NZ and may be applied at a uniform amount and at a uniform thickness, so that the resin composition RC does not deviate from a member to which the resin composition RC is to be provided.

The resin composition RC according to an embodiment is a photocurable resin composition. The resin composition RC may be a UV curable resin that is cured by UV rays. The resin composition RC may be in a liquid phase before curing, and may be crosslinked or cured by receiving light energy such as UV rays.

The resin composition RC according to an embodiment may include at least one (meth)acrylate polymer (A), at least one photoinitiator (B), at least one urethane (meth)acrylate oligomer (C), and at least one (meth)acrylate monomer (D) containing a (meth)acryloyl group.

The (meth)acrylate polymer (A) may be a polymer synthesized with a first monomer. The (meth)acrylate polymer (A) may be a polymer synthesized with a (meth)acrylate monomer containing a linear or branched alkyl group. In an embodiment, the (meth)acrylate polymer (A) may include a linear or branched alkyl group at a main chain or side chain thereof. In an embodiment, the (meth)acrylate polymer (A) may be derived from a monomer represented by Formula 1. For example, the (meth)acrylate polymer (A) may be synthesized with a first monomer represented by Formula 1:

[Formula 1]

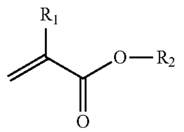

In Formula 1, $R_1$ may be a hydrogen atom or a substituted or unsubstituted methyl group, and $R_2$ may be a substituted or unsubstituted linear alkyl group having 1 to 20 carbon atoms or a substituted or unsubstituted branched alkyl group having 1 to 20 carbon atoms. For example, $R_1$ may be a hydrogen atom or an unsubstituted methyl group, and $R_2$ may be an unsubstituted methyl group, an unsubstituted 2-ethylhexyl group, or an unsubstituted dodecyl group. For example, the (meth)acrylate polymer (A) may be derived from a monomer in which both $R_1$ and $R_2$ in Formula 1 are unsubstituted methyl groups, and a monomer in which $R_1$ in Formula 1 is a methyl group and $R_2$ is an unsubstituted 2-ethylhexyl group or an unsubstituted dodecyl group. In an embodiment, $R_1$ may be an unsubstituted methyl group, and $R_2$ may be an unsubstituted methyl group, an unsubstituted 2-ethylhexyl group, or an unsubstituted dodecyl group In the specification, the term "substituted or unsubstituted" may describe a group that is unsubstituted or substituted with at least one substituent selected from the group consisting of a deuterium atom, a halogen atom, a cyano group, a nitro group, an amino group, a silyl group, an oxy group, a thio group, a sulfinyl group, a sulfonyl group, a carbonyl group, a boron group, a phosphine oxide group, a phosphine sulfide group, an alkyl group, an alkenyl group, an alkynyl group, a hydrocarbon ring group, an aryl group, and a heterocyclic group. Each of the substituents listed above may itself be substituted or unsubstituted. For example, a biphenyl group may be interpreted as an aryl group, or it may be interpreted as a phenyl group substituted with a phenyl group.

In the specification, examples of a "linear or branched alkyl group" may include a methyl group, an ethyl group, an n-propyl group, an isopropyl group, an n-butyl group, an s-butyl group, a t-butyl group, an i-butyl group, a 2-ethylbutyl group, a 3,3-dimethylbutyl group, an n-pentyl group, an i-pentyl group, a neopentyl group, a t-pentyl group, a 1-methylpentyl group, a 3-methylpentyl group, a 2-ethylpentyl group, a 4-methyl-2-pentyl group, an n-hexyl group, a 1-methylhexyl group, a 2-ethylhexyl group, a 2-butylhexyl group, an n-heptyl group, a 1-methylheptyl group, a 2,2-dimethylheptyl group, a 2-ethylheptyl group, a 2-butylheptyl group, a 3-methylheptyl group, an n-octyl group, a t-octyl group, a 2-ethyloctyl group, a 2-butyloctyl group, a 2-hexyloctyl group, a 3,7-dimethyloctyl group, an n-nonyl group, an n-decyl group, an adamantyl group, a 2-ethyldecyl group, a 2-butyldecyl group, a 2-hexyldecyl group, a 2-octyldecyl group, an n-undecyl group, an n-dodecyl group, a 2-ethyldodecyl group, a 2-butyldodecyl group, a 2-hexyldocecyl group, a 2-octyldodecyl group, an n-tridecyl group, an n-tetradecyl group, an n-pentadecyl group, an n-hexadecyl group, a 2-ethylhexadecyl group, a 2-butylhexadecyl group, a 2-hexylhexadecyl group, a 2-octylhexadecyl group, an n-heptadecyl group, an n-octadecyl group, an n-nonadecyl group, an n-cicosyl group, etc., but embodiments are not limited thereto.

In an embodiment, the (meth)acrylate polymer (A) may be synthesized with the first monomer and a second monomer that is different polymer the first monomer. In an embodiment, the first monomer may include methyl (meth)acrylate, 2-ethylhexyl (meth)acrylate, or dodecyl (meth)acrylate. In an embodiment, the second monomer may include glycidyl (meth)acrylate.

In an embodiment, the first monomer may include methyl (meth)acrylate, and the second monomer may include 2-ethylhexyl (meth)acrylate or dodecyl (meth)acrylate.

In an embodiment, an end group of the (meth)acrylate polymer (A) may include a (meth)acrylate group. In an embodiment, the (meth)acrylate polymer (A) may include a (meth)acrylate group at an end group. An end group of the (meth)acrylate polymer (A) may include a (meth)acrylate group, and thus analysis results of proton nuclear magnetic resonance spectrometry (1H NMR) with respect to the (meth)acrylate polymer (A) may be about 5.6 ppm or about 6.2 ppm. An end group of the (meth)acrylate polymer (A) may include a (meth)acrylate group, and thus the (meth)acrylate polymer (A) may be a reactive polymer.

In an embodiment, the (meth)acrylate polymer (A) may have a weight average molecular weight in a range of about 4,000 to about 20,000. For example, in an embodiment, the (meth)acrylate polymer (A) may have a weight average molecular weight in a range of about 8,000 to about 9,500. When the resin composition RC includes the (meth)acrylate polymer (A) having the weight average molecular weight within any of the above ranges, the resin composition RC may be readily discharged from a nozzle NZ and may be applied at a uniform amount and at a uniform thickness.

In an embodiment, an amount of the (meth)acrylate polymer (A) may be in a range of about 1 wt % to about 20 wt %, with respect to a total weight of the resin composition RC. When the resin composition RC includes an amount of the (meth)acrylate polymer (A) within the above range, it may thus have an appropriate shear viscosity to be readily discharged from the nozzle NZ, so that the resin composition RC may be provided by an inkjet printing method or a dispensing method. When the resin composition RC includes an amount of the (meth)acrylate polymer (A) within the above range, the adhesive member AP that is formed from the resin composition RC may have excellent adhesive strength, and may be readily folded and unfolded.

The resin composition RC may include at least one photoinitiator (B). In an embodiment, the photoinitiator (B) may include a radical polymerization initiator. When the resin composition RC includes multiple photoinitiators (B), different photoinitiators may be activated by ultraviolet light having different central wavelengths.

For example, the photoinitiator (B) may include at least one of 2,2-dimethoxy-1,2-diphenylethan-1-one, 1-hydroxy cyclohexyl-phenylketone, 2-hydroxy-2-methyl-1-phenyl-1-propanone, 2-hydroxy-1-[4-(2-hydroxyethoxy)phenyl]-2-methyl-1-propanone, and 2-hydroxy-1-{4-[4-(2-hydroxy-2-methyl-propionyl)-benzyl]-phenyl}-2-methylpropan-1-one.

In an embodiment, the photoinitiator (B) may include at least one of 2-methyl-1[4-(methylthio)phenyl]-2-morpholinopropan-1-one, 2-benzyl-2-dimethylamino-1-(4-morpholinophenyl)-butanone-1,2-dimethylamino-2-(4-methyl-benzyl)-1-(4-morpholin-4-yl-phenyl)-butan-1-one, 2,4,6-trimethylbenzoyl-diphenylphosphine oxide, ethyl(2,4,6-trimethylbenzoyl)phenyl phosphinate, phenylbis(2,4,6-trimethylbenzoyl)phosphine oxide, [1-(4-phenylsulfanylbenzoyl)heptylideneamino]benzoate, [1-[9-ethyl-6-(2-methylbenzoyl)carbazol-3-yl]ethylideneamino] acetate, and bis(2,4-cyclopentadienyl)bis[2,6-difluoro-3-(1-pyrryl)phenyl] titanium(IV).

An amount of the photoinitiator (B) may be in a range of about 1 wt % to 10 wt %, with respect to a total weight of the resin composition RC. In an embodiment, an amount of the photoinitiator (B) may be in a range of about 1 wt % to about 5 wt %, with respect to a total weight of the resin composition RC. However, this is only an example, and the amount of the photoinitiator (B) is not limited thereto.

The resin composition RC may include at least one (meth)acrylate monomer (C). In an embodiment, the (meth) acrylate monomer (C) may include a (meth)acryloyl group. In the specification, the term "(meth)acryloyl group" may refer to an acryloyl group or a methacryloyl group, the term "(meth)acrylate" may refer to acrylate or methacrylate. For example, the (meth)acrylate monomer (C) may be an acrylate monomer or a methacrylate monomer containing one acryloyl group or one methacryloyl group. In an embodiment, the (meth)acrylate monomer (C) may be 4-hydroxybutyl acrylate, isodecyl acrylate, tetrahydrofurfuryl acrylate, isobornyl acrylate, or 1,9-nonanediol diacrylate. For example, the resin composition RC may include all of 4-hydroxybutyl acrylate, isodecyl acrylate, tetrahydrofurfuryl acrylate, isobornyl acrylate, and 1,9-nonanediol diacrylate.

An amount of the (meth)acrylate monomer (C) may be in a range of about 50 wt % to 90 wt %, with respect to a total weight of the resin composition RC. In an embodiment, an amount of the (meth)acrylate monomer (C) may be in a range of about 75 wt % to about 90 wt %, with respect to a total weight of the resin composition RC. When an amount of the (meth)acrylate monomer (C) is less than about 75 wt % with respect to a total weight of the resin composition RC, crosslinking in the resin composition RC may become excessive so that tack characteristics of the surface of a resulting polymer may be reduced. Accordingly, an adhesive member formed from the resin composition RC may have reduced peel strength to the glass substrate. When an amount of the (meth)acrylate monomer (C) is greater than about 90 wt % with respect to a total weight of the resin composition RC, crosslinking in the resin RC composition may be insufficient so that cohesive force may be reduced. Accordingly, an adhesive member from the resin composition RC may have reduced peel strength to the glass substrate.

When the resin composition RC includes at least two kinds of (meth)acrylate monomers, a sum of the amounts of the at least two kinds of (meth)acrylate monomers may be in a range of about 50 wt % to about 90 wt %, with respect to a total weight of the resin composition RC.

When the resin composition RC includes an amount of the (meth)acrylate monomer (C) within any of the above ranges, the resin composition RC may have an appropriate shear viscosity to be readily discharged from a nozzle NZ, so that the resin composition RC may be provided by an inkjet printing method or by a dispensing method. When the resin composition RC includes an amount of the (meth)acrylate monomer (C) within any of the above ranges, the adhesive member AP that is formed from the resin composition RC may have excellent adhesive strength, and may be readily folded and unfolded.

The resin composition RC may include at least one urethane (meth)acrylate oligomer (D). For example, the resin composition RC may include a urethane acrylate oligomer, or the resin composition RC may include at least two kinds of urethane acrylate oligomers each having a different weight average molecular weight.

In an embodiment, a weight average molecular weight of the urethane (meth)acrylate oligomer (D) may be in a range of about 5,000 to about 40,000. The resin composition RC includes the urethane (meth)acrylate oligomer (D) having a weight average molecular weight in a range of about 5,000 to about 40,000 in an oligomer state, which has a relatively high degree of polymerization, and maintains a high degree of polymerization even after photo-curing, so that an adhesive member AP having excellent adhesive reliability may be formed.

In an embodiment, an amount of the urethane (meth) acrylate oligomer (D) may be in a range of about 1 wt % to about 20 wt %, with respect to a total weight of the resin composition RC. For example, an amount of the urethane (meth)acrylate oligomer (D) may be about 4 wt %, with respect to a total weight of the resin composition RC. However, this is only an example, and the amount of the urethane (meth)acrylate oligomer (D) is not limited thereto.

FIG. 5B is a schematic cross-sectional view illustrating a step of forming the adhesive member AP by providing light to the resin composition RC. Referring to FIG. 5B, a preliminary adhesive member P-AP formed by applying the resin composition RC at a constant thickness may be irradiated with ultraviolet light UV-L. FIG. 5B illustrates that the preliminary adhesive member P-AP is directly irradiated with the ultraviolet light UV-L, but embodiments are not limited thereto. A carrier film (not shown) may be disposed on the preliminary adhesive member P-AP, and the carrier film (not shown) may cover the preliminary adhesive member P-AP during the curing process. The carrier film (not shown) may transmit the ultraviolet light UV-L.

Referring to FIGS. 5A and 5B, the ultraviolet light UV-L may be provided to the preliminary adhesive member P-AP in the presence of oxygen. The adhesive member AP (see FIG. 5C) may be formed by curing the resin composition RC in the presence of oxygen. In order to form the adhesive member AP from the resin composition RC, the ultraviolet light UV-L may be provided once, twice, or more. For example, in order to form the adhesive member AP (see FIG.

5C) from the resin composition RC, when the ultraviolet light UV-L is provided twice, the ultraviolet light UV-L may be provided to the applied resin composition RC to be temporarily cured, and the ultraviolet light UV-L may be provided to the temporarily cured resin composition to be finally cured. The resin composition RC may be finally cured, thereby forming the adhesive member AP (see FIG. 5C).

FIG. 5C is a schematic cross-sectional view illustrating a step of detaching the adhesive member AP from the substrate CF. FIG. 5C illustrates that the substrate CF is detached from the adhesive member AP that is formed by providing the ultraviolet light UV-L (see FIG. 5B) to the preliminary adhesive member P-AP (see FIG. 5B).

Referring to FIGS. 5A to 5C, in an embodiment, the adhesive member AP formed by curing the resin composition RC in the presence of oxygen may have a 180° peel strength equal to or greater than about 100 gf/25 mm at about 60° C. to glass. For example, the adhesive member AP may have a 180° peel strength in a range of about 100 gf/25 mm to about 1,000 gf/25 mm at about 60° ° C. to glass. For example, the adhesive member AP may have a 180° peel strength in a range of about 300 gf/25 mm to about 800 gf/25 mm at about 60° C. to glass. When a conventional curable resin composition is cured in the presence of oxygen in the air, the polymerization reaction may be inhibited by the oxygen. Accordingly, an adhesive member that is formed by curing a conventional resin composition in the presence of oxygen has low adhesion. Even when the resin composition RC according to an embodiment is cured in the presence of oxygen, the resin composition RC includes the (meth)acrylate polymer (A) containing a (meth)acrylate group at an end group, and thus may form the adhesive member AP having excellent adhesive reliability. For example, in an embodiment, the adhesive member AP may exhibit excellent peel strength in a humid heat environment even when photo-cured in the presence of oxygen.

In an embodiment, the adhesive member AP formed by curing the resin composition RC may have a storage modulus (G') equal to or less than about 0.2 MPa, at about −20° C. For example, the adhesive member AP formed by curing the resin composition RC may have a storage modulus (G') in a range of about 0.01 MPa to about 0.2 MPa, at about −20° ° C. In an embodiment, the resin composition RC has a low storage modulus (G') value even when photo-cured, and thus may exhibit excellent adhesive reliability. Accordingly, the adhesive member AP formed from the resin composition RC may be reliably folded and unfolded because bending at the interface does not occur.

The detached adhesive member AP may be provided on a surface of the window WP (see FIG. 4) or a surface of the display module DM (see FIG. 4). A surface of the adhesive member AP is laminated on a surface of the window WP (see FIG. 4) or on a surface of the display module DM (see FIG. 4), and a surface of the window WP (see FIG. 4) or a surface of the display module DM (see FIG. 4) that is not attached may be attached to the other surface of the adhesive member AP.

Figure 6A:
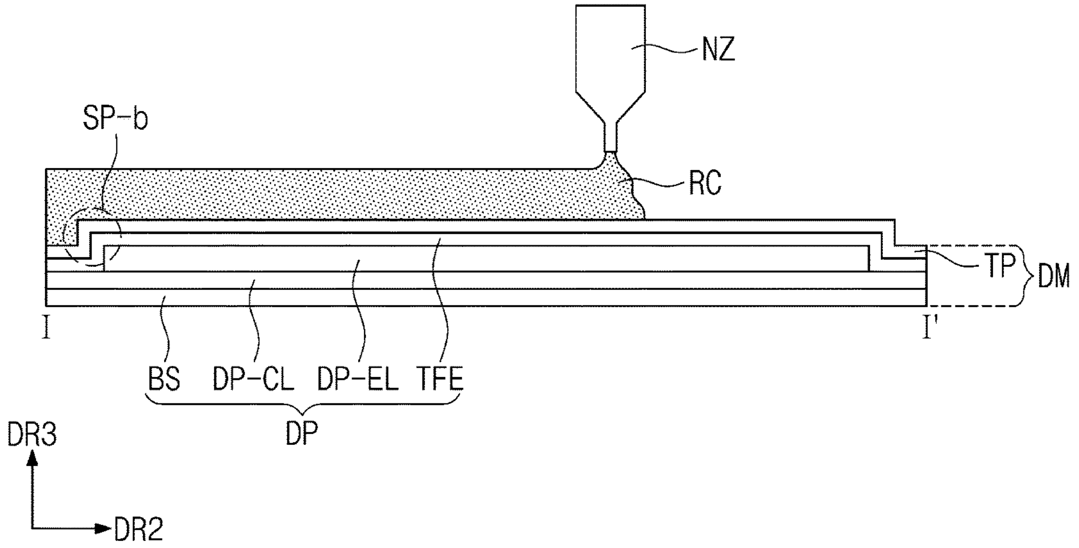
FIGS. 6A and 6B are each a schematic cross-sectional view of steps of a method for manufacturing an adhesive member according to an embodiment.
Figure 6B:
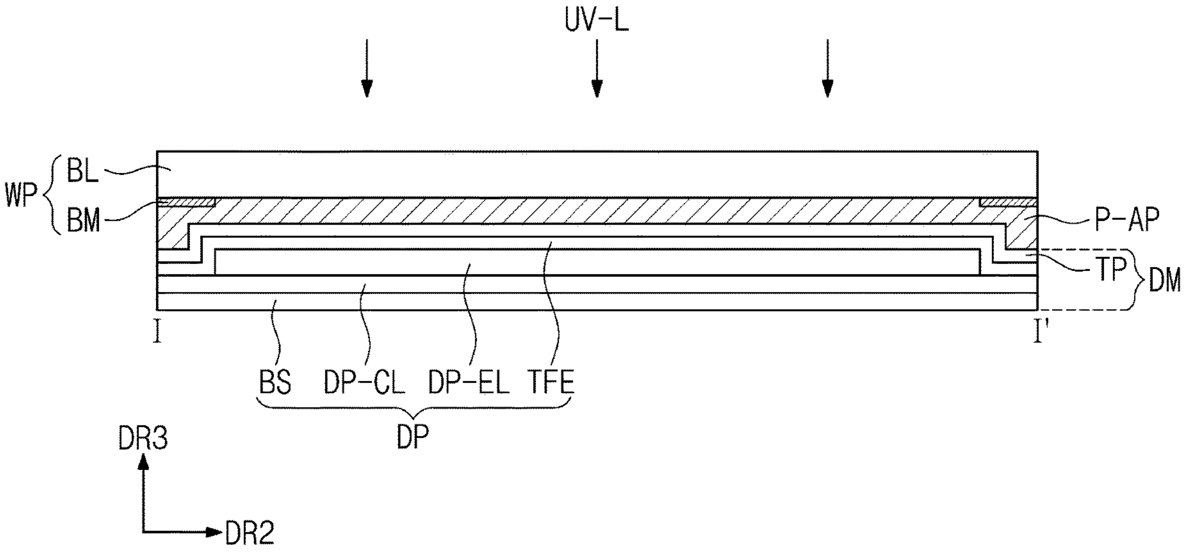

FIGS. 6A and 6B are each a schematic cross-sectional view of steps of a method for manufacturing an adhesive member AP according to an embodiment.

FIGS. 6A and 6B are schematic cross-sectional views of a manufacturing method that is different from the method for manufacturing an adhesive member AP described with reference to FIGS. 5A to 5C. In the description of FIGS. 6A and 6B, the features which have been described above with reference to FIGS. 1 to 5C will not be described again, and the differing features will be described.

Referring to FIG. 6A, the resin composition RC may be provided directly on a surface of a display module DM or a surface of a window WP (see FIG. 6B). FIG. 6A illustrates that the resin composition RC is provided directly on a surface of the display module DM. The resin composition RC having a shear viscosity in a range of about 8 mPa·s to about 50 Pas as measured at about 25° C. and about 10 rpm according to a JIS Z8803 method may be provided while covering the uneven portion of a stepped portion SP-b in the display module DM.

Referring to FIG. 6B, the window WP may be provided on a preliminary adhesive member P-AP that is formed by applying the resin composition RC at a constant thickness. Ultraviolet light UV-L may be provided to the preliminary adhesive member P-AP. The ultraviolet light UV-L may be transmitted through the window WP to be provided to the preliminary adhesive member P-AP. The preliminary adhesive member P-AP may be cured to form the adhesive member AP (see FIG. 4).

In another embodiment, the preliminary adhesive member P-AP may be directly irradiated with the ultraviolet light UV-L to form the adhesive member AP (see FIG. 4). The window may be provided on the formed adhesive member AP (see FIG. 4).

Figure 7:
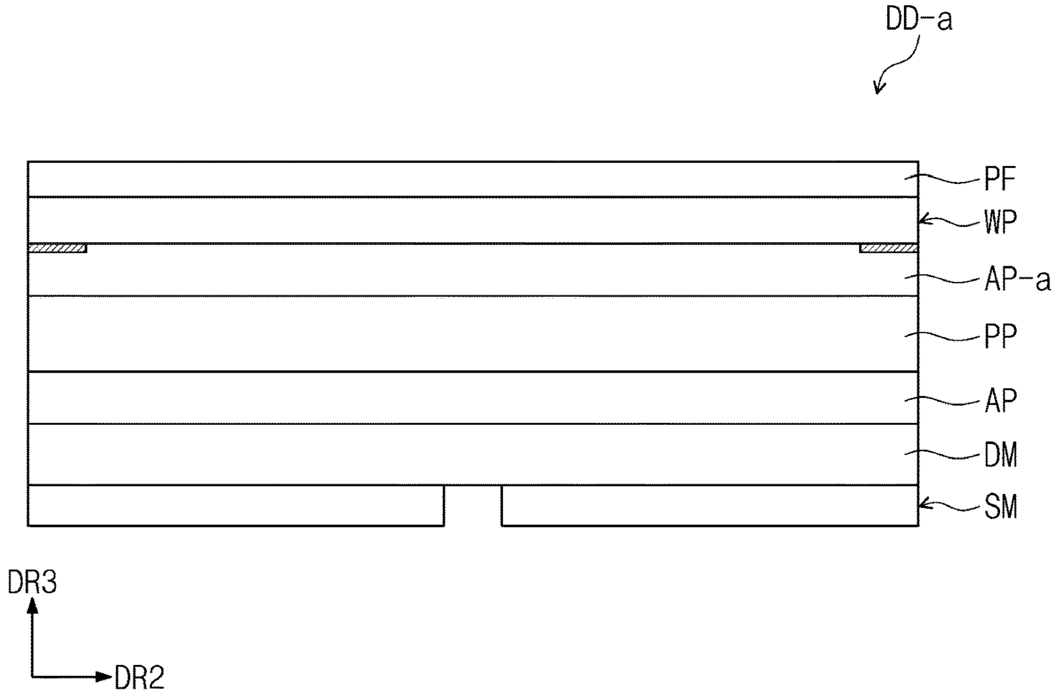
FIG. 7 is a schematic cross-sectional view of a display device according to an embodiment.

FIG. 7 is a schematic cross-sectional view of a display device DD-a according to an embodiment.

In the description of the display device DD-a illustrated in FIG. 7, the features which have been described above with reference to FIGS. 1 to 6B will not be described again, and the differing features will be described.

The display device DD-a illustrated in FIG. 7 may further include a light control layer PP and an optical adhesive layer AP-a, as compared with the display device DD described with reference to FIGS. 3 and 4. The light control layer PP may be disposed between the adhesive member AP and the window WP. The optical adhesive layer AP-a may be disposed between the light control layer PP and the window WP.

The light control layer PP may be disposed on a display panel DP to control light that is reflected at the display panel DP from an external light. The light control layer PP may include, for example, a polarization plate or a color filter layer.

The optical adhesive layer AP-a may be formed from the resin composition RC according to an embodiment. The optical adhesive layer AP-a may include a polymer derived from the resin composition RC according to an embodiment. The optical adhesive layer AP-a including the polymer derived from the resin composition RC may have a 180° peel strength in a range of about 100 gf/25 mm to about 1,000 gf/25 mm at about 60° ° C. to glass or a polyethylene terephthalate (PET) film. The optical adhesive layer AP-a including the polymer derived from the resin composition RC may have a storage modulus (G') in a range of about 0.01 MPa to about 0.2 MPa, at about −20° C. Accordingly, the optical adhesive layer AP-a including the polymer derived from the resin composition RC according to an embodiment has high adhesive characteristics and flexibility, and thus bending at the interface of the optical adhesive layer AP-a does not occur, even when the display device DD-a is folded or bent, so that the display device DD-a may exhibit excellent adhesive reliability and folding characteristics.

The display device DD-a of an embodiment may include the optical adhesive layer AP-a including the polymer derived from the resin composition RC according to an embodiment and the adhesive member AP, and the display device DD-a including the optical adhesive layer AP-a and the adhesive member AP may exhibit excellent reliability when the display device DD-a is bent, folded, or rolled.

Figure 8:
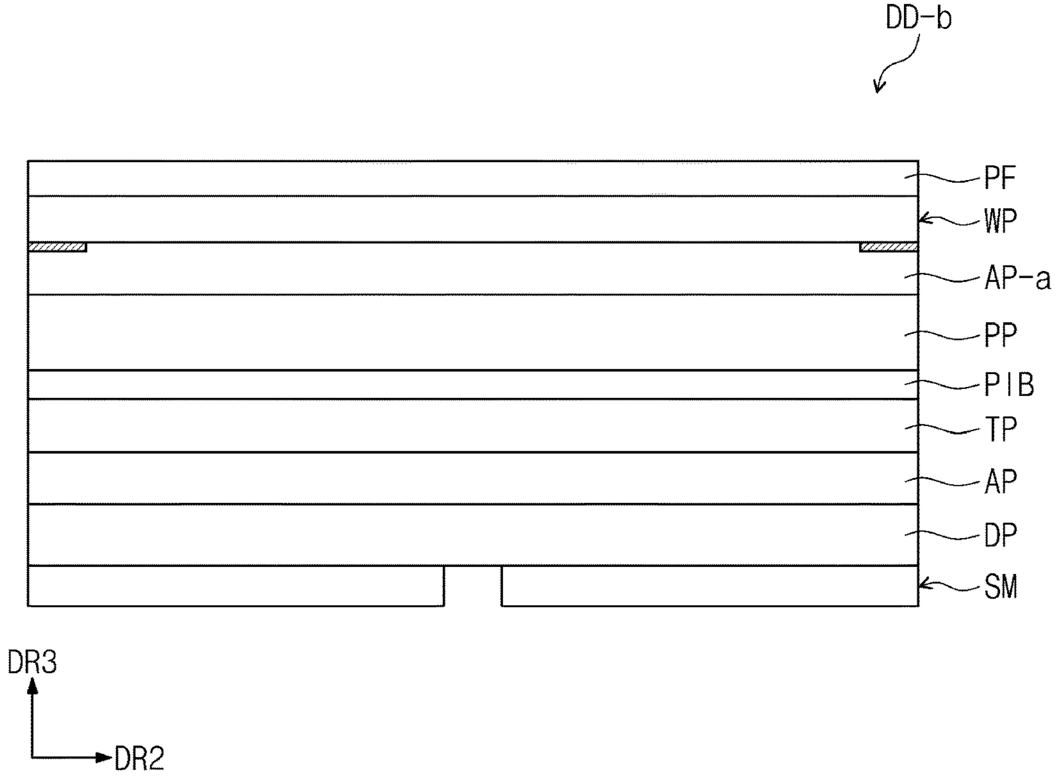
FIG. 8 is a schematic cross-sectional view of a display device according to an embodiment.

FIG. 8 is a schematic cross-sectional view of a display device DD-b according to an embodiment.

In the description of the display device DD-b illustrated in FIG. 8, the features which have been described above with reference to FIGS. 1 to 7 will not be described again, and the differing features will be described.

The display device DD-b illustrated in FIG. 8 may further include a light control layer PP, an optical adhesive layer AP-a, and an interlayer adhesive layer PIB, as compared with the display device DD described with reference to FIGS. 3 and 4. The light control layer PP may be disposed between the adhesive member AP and the window WP. The optical adhesive layer AP-a may be disposed between the light control layer PP and the window WP.

In the display device DD-b according to an embodiment, the adhesive member AP may be disposed between a display panel DP and an input sensing unit TP. For example, the input sensing unit TP may not be disposed directly on the display panel DP, and the display panel DP and the input sensing unit TP may be attached to each other via the adhesive member AP. For example, the adhesive member AP may be disposed between the encapsulation layer TFE (see FIG. 4) of the display panel DP and the input sensing unit TP.

The interlayer adhesive layer PIB may be provided on a bottom side of the light control layer PP. The interlayer adhesive layer PIB may be disposed between the input sensing unit TP and the light control layer PP, and be formed of an adhesive material having excellent prevention of moisture permeation. For example, the interlayer adhesive layer PIB may include polyisobutylene. The interlayer adhesive layer PIB may be disposed on the input sensing unit TP to prevent corrosion of sensing electrodes of the input sensing unit TP.

The display device DD-b may include the optical adhesive layer AP-a including the polymer derived from the resin composition RC according to an embodiment and the adhesive member AP, and the display device DD-b including the optical adhesive layer AP-a and the adhesive member AP may exhibit excellent reliability when the display device DD-b is bent, folded, or rolled.

Hereinafter, an adhesive member and a display device formed from a resin composition according to an embodiment will be described in detail with reference to the Examples and the Comparative Examples. The Examples described below are only provided as illustrations to assist in understanding the disclosure, and the scope thereof is not limited thereto.

EXAMPLES

1. Synthesis of (Meth)Acrylate Polymers (A)

M-1, M-2, A-1, A-2, and A-3 (meth)acrylate polymers (A) provided to the resin compositions of the Examples and the Comparative Examples were synthesized by the method described below. M-1 and M-2 (meth)acrylate polymers (A) are (meth)acrylate polymers (A) of the Examples, and A-1, A-2, and A-3 (meth)acrylate polymers (A) are (meth)acrylate polymers (A) of the Comparative Examples.

In the Synthesis Examples, molecular weight and molecular weight distribution were measured by HLC-8420GPC, which is a gel permeation chromatography analyzer manufactured by TOSHO corporation. From a size exclusion chromatography (SEC) curve obtained by using TSKgel SUPER HZM-N as a measurement column and a refractive index (RI) detector, number average molecular weight (Mn) values and molecular weight distribution values were obtained with a standard polystyrene (PS) conversion.

The composition ratio of the copolymer was calculated from the integral ratio of the signals which were measured by AVANCE III 300M, a nuclear magnetic resonance (NMR) analyzer manufactured by Bruker, and measured from each monomer component in the NMR spectrum. As an intermediate solvent in the measurement, deuterated chloroform (manufactured by KANTO CHEMICAL CO. INC.) was used.

(1) Synthesis of A-1 (Meth)Acrylate Polymer (A)

Dimethylformamide (DMF, 40 mL) was added to a round flask equipped with a cooling tube, a drip funnel, a nitrogen introduction tube, and a magnetic stirrer and was stirred at room temperature for about 30 minutes while nitrogen was bubbled to perform deoxidation of the solvent.

This was heated in an oil bath until the internal temperature reached about 90° C., and 17.0 g of methyl methacrylate (MMA, TOKYO KASEIKOGYO), 6.0 g of 2-ethylhexyl methacrylate (2-EHMA, TOKYO KASEIKOGYO), as a methacrylic acid monomer, 1.7 g of V-501 (Fujifilm WAKO-JUNYAKU) as a thermal polymerization initiator, and 10 mL of dimethylformamide (DMF) were made into a homogeneous solution in advance and added to the drip funnel. A stopcock was opened, and the homogeneous solution in the drip funnel was slowly dropped into a flask over about 1 hour, and stirred for about 1 hour to perform a polymerization reaction.

600 mL of distilled water was added to a 1000-mL beaker and stirred with a magnetic stirrer, and the solution after the polymerization reaction in the flask was dropped thereto in small portions to precipitate. The precipitates were suction-filtered, washed with 58 vol % aqueous ethanol solution (Fujifilm WAKOJUNYAKU), and filtered to remove dimethylformamide (DMF) and unreacted monomers. The precipitates were dried under reduced pressure to obtain 18 g of white powder (A-1 (meth)acrylate polymer (A)) which is a copolymer of MMA and 2-EHMA.

The weight average molecular weight of A-1 (meth) acrylate polymer (A) was 8,300 and the molecular weight distribution was 1.51. The copolymerization composition ratio of A-1 (meth)acrylate polymer (A) was MMA:2-EHMA=80.3:19.7.

(2) Synthesis of A-2 (Meth)Acrylate Polymer (A)

Dimethylformamide (DMF, 40 mL) was added to a round flask equipped with a cooling tube, a drip funnel, a nitrogen introduction tube, and a magnetic stirrer and was stirred at room temperature for about 30 minutes while nitrogen was bubbled to perform deoxidation of the solvent.

This was heated in an oil bath until the internal temperature reached about 90° C., and 14.1 g of methyl methacrylate (MMA, TOKYO KASEIKOGYO), 8.7 g of dodecyl methacrylate (DDMA, TOKYO KASEIKOGYO), as a methacrylic acid monomer, 1.7 g of V-501 (Fujifilm WAKOJUNYAKU) as a thermal polymerization initiator, and 10 mL of dimethylformamide (DMF) were made into a homogeneous solution in advance and added to the drip funnel. A stopcock was opened, and the homogeneous solution in the drip funnel was slowly dropped into a flask over about 1 hour, and stirred for about 1 hour to perform a polymerization reaction.

600 mL of distilled water was added to a 1000-mL beaker and stirred with a magnetic stirrer, and the solution after the polymerization reaction in the flask was dropped thereto in small portions to precipitate. The precipitates were suction-filtered, washed with 58 vol % aqueous ethanol solution (Fujifilm WAKOJUNYAKU), and filtered to remove dimethylformamide (DMF) and unreacted monomers. The precipitates were dried under reduced pressure to obtain 17 g of white powder (A-2 (meth)acrylate polymer (A)) which is a copolymer of MMA and DDMA.

The weight average molecular weight of A-2 (meth) acrylate polymer (A) was 8,800 and the molecular weight distribution was 1.54. The copolymerization composition ratio of A-2 (meth)acrylate polymer (A) was MMA: DDMA=81.2:18.8.

(3) Synthesis of A-3 (Meth)Acrylate Polymer (A)

Dimethylformamide (DMF, 40 mL) was added to a round flask equipped with a cooling tube, a drip funnel, a nitrogen introduction tube, and a magnetic stirrer and was stirred at room temperature for about 30 minutes while nitrogen was bubbled to perform deoxidation of the solvent.

This was heated in an oil bath until the internal temperature reached about 90° C., and 14.1 g of methyl methacrylate (MMA, TOKYO KASEIKOGYO), 5.7 g of cyclohexyl methacrylate (CHMA, TOKYO KASEIKOGYO), as a methacrylic acid monomer, 1.7 g of V-501 (Fujifilm WAKOJUNYAKU) as a thermal polymerization initiator, and 10 mL of dimethylformamide (DMF) were made into a homogeneous solution in advance and added to the drip funnel. A stopcock was opened, and the homogeneous solution in the drip funnel was slowly dropped into a flask over about 1 hour, and stirred for about 1 hour to perform a polymerization reaction.

600 mL of distilled water was added to a 1000-mL beaker and stirred with a magnetic stirrer, and the solution after the polymerization reaction in the flask was added thereto in small portions to precipitate. The precipitates were suction-filtered, washed with 58 vol % aqueous ethanol solution (Fujifilm WAKOJUNYAKU), and filtered to remove dimethylformamide (DMF) and unreacted monomers. The precipitates were dried under reduced pressure to obtain 20 g of white powder (A-3 (meth)acrylate polymer (A)) which is a copolymer of MMA and CHMA.

The weight average molecular weight of A-3 (meth) acrylate polymer (A) was 8,500 and the molecular weight distribution was 1.51. The copolymerization composition ratio of A-3 (meth)acrylate polymer (A) was MMA: CHMA=79.2:20.8.

(4) Synthesis of M-1 (Meth)Acrylate Polymer (A)

In order to introduce a (meth)acrylate group into the end group of A-1 (meth)acrylate polymer (A), the following process was performed. To a round flask equipped with a cooling tube and a magnetic stirrer, 5 g of A-1 (meth) acrylate polymer (A), 20 mL of dimethylformamide (DMF), 0.05 g of triphenylphosphine (TPP, Fujifilm WAKOJUNYAKU), and 5 mg of 4-methoxyphenol (MEHQ, TOKYO KASEIKOGYO) were added and heated in an oil bath until the internal temperature reached about 120° C. 1 mL of glycidyl methacrylate (GMA, TOKYO KASEIKOGYO) was added thereto and reacted for about 3 hours.

600 mL of 58 vol % aqueous ethanol solution was added to a 1000-mL beaker and stirred with a magnetic stirrer, and the solution after the reaction in the flask was dropped thereto in small portions to precipitate. The precipitates were suction-filtered, washed with 58 vol % aqueous ethanol solution (Fujifilm WAKOJUNYAKU), and filtered to remove dimethylformamide (DMF) and unreacted monomers. The precipitates were dried under reduced pressure to obtain 4 g of white powder (M-1 (meth)acrylate polymer (A)) which is a copolymer having a (meth)acrylate group at the polymerization end group.

The weight average molecular weight of M-1 (meth) acrylate polymer (A) was 8,500 and the molecular weight distribution was 1.43. The introduction of (meth)acrylate group was confirmed by a proton nuclear magnetic resonance spectrometry (1H NMR). The peak value confirmed through 1H NMR of M-1 (meth)acrylate polymer (A) is as follows. Upon the 1H NMR measurement, tetramethylsilane (TMS) was used as a reference material, 1H NMR was measured at a resonance frequency of 300 MHZ, and a chemical shift value was set forth as δ (ppm).

$^1$H NMR value of M-1 (TMS, 300 MHz) δ: 5.66 and 6.22

It was confirmed by the derived 1H NMR peak value that a (meth)acrylate group was introduced into the end group of M-1 (meth)acrylate polymer (A).

(5) Synthesis of M-2 (Meth)Acrylate Polymer (A)

In order to introduce a (meth)acrylate group into the end group of A-2 (meth)acrylate polymer (A), the following process was performed. To a round flask equipped with a cooling tube and a magnetic stirrer, 5 g of A-2 (meth) acrylate polymer (A), 20 mL of dimethylformamide (DMF), 0.05 g of triphenylphosphine (TPP, Fujifilm WAKOJUNYAKU), and 5 mg of 4-methoxyphenol (MEHQ. TOKYO KASEIKOGYO) were added and heated in an oil bath until the internal temperature reached about 120° C. 1 mL of glycidyl methacrylate (GMA, TOKYO KASEIKOGYO) was added thereto and reacted for about 3 hours.

600 mL of 58 vol % aqueous ethanol solution was added to a 1000-mL beaker and stirred with a magnetic stirrer, and the solution after the reaction in the flask was dropped thereto in small portions to precipitate. The precipitates were suction-filtered, washed with 58 vol % aqueous ethanol solution (Fujifilm WAKOJUNYAKU), and filtered to remove dimethylformamide (DMF) and unreacted monomers. The precipitates were dried under reduced pressure to obtain 4 g of white powder (M-2 (meth)acrylate polymer (A)) which is a copolymer having a (meth)acrylate group at the polymerization end group.

The weight average molecular weight of M-2 (meth) acrylate polymer (A) was 9,100 and the molecular weight distribution was 1.49. The introduction of (meth)acrylate group was confirmed by a proton nuclear magnetic resonance spectrometry (1H NMR). The peak value confirmed through 1H NMR of M-2 (meth)acrylate polymer (A) is as follows. Upon the 1H NMR measurement, tetramethylsilane (TMS) was used as a reference material, 1H NMR was measured at a resonance frequency of 300 MHz, and a chemical shift value was set forth as δ (ppm).

$^1$H NMR value of M-2 (TMS, 300 MHz) δ: 5.66 and 6.22

It was confirmed by the derived 1H NMR peak value that a (meth)acrylate group was introduced into the end group of M-2 (meth)acrylate polymer (A).

2. Preparation of Resin Composition

The resin compositions of Examples were prepared by mixing each of materials listed in Table 1. The resin compositions of Comparative Examples were prepared by mixing each of materials listed in Table 2. Each of the materials was placed in a light-shielding poly container by the weight (g) set forth in Tables 1 and 2 and stirred at room temperature to prepare the resin compositions of Examples 1 to 3 and Comparative Examples 1 to 4.

TABLE 1

| Materials | | Example 1 | Example 2 | Example 3 | Example 4 | Example 5 |
|---|---|---|---|---|---|---|
| (Meth)acrylate oligomer (A) | M-1 | 10 | 10 | | 7 | |
| | M-2 | | | 10 | | 15 |
| Photoinitiator (B) | Omnirad 819 | 3 | 3 | 3 | | |
| (Meth)acrylate monomer (C) | 4-HBA | 7 | 7 | 7 | | |
| | 2-EHA | 60 | 70 | 60 | | |
| | THF-A | 15 | | 15 | | |
| | EHDG-AT | 15 | 15 | 15 | | |
| Urethane (meth)acrylate oligomer (D) | UF-C051 | 2 | | 2 | | |
| | UN6304 | 5 | | 5 | | |
| | UV-3300B | | 8 | | | |
| Tackifier | KE311 | | | | | |

TABLE 2

| Materials | | Comparative Example 1 | Comparative Example 2 | Comparative Example 3 | Comparative Example 4 | Comparative Example 5 | Comparative Example 6 |
|---|---|---|---|---|---|---|---|
| (Meth)acrylate oligomer (A) | A-1 | 10 | | | | | |
| | A-2 | | 10 | | | | |
| | A-3 | | | 10 | | | |
| | M-1 | | | | | 25 | |
| | M-2 | | | | | | 30 |
| Photoinitiator (B) | Omnirad 819 | 3 | 3 | 3 | 3 | | |
| (Meth)acrylate monomer (C) | 4-HBA | 7 | 7 | 7 | 7 | | |
| | 2-EHA | 60 | 60 | 60 | 60 | | |
| | THF-A | 15 | 15 | 15 | 15 | | |
| | EHDG-AT | 15 | 15 | 15 | 15 | | |
| Urethane (meth)acrylate oligomer (D) | UF-C051 | 2 | 2 | 2 | 2 | | |
| | UN6304 | 5 | 5 | 5 | 5 | | |
| | UV-3300B | | | | | | |
| Tackifier | KE311 | | | | 10 | | |

Referring to Table 1, the resin compositions of Examples 1 to 3 include the (meth)acrylate polymers (A) according to embodiments, which are M-1 or M-2. Examples 1 to 3 includes M-1 or M-2 containing a (meth)acrylate group at an end group of the polymer. The resin compositions of Examples 1 to 3 include about 1 wt % to about 20 wt % of the (meth)acrylate polymer (A) with respect to a total weight of the resin composition.

Referring to Table 2, the resin composition of Comparative Examples 1 to 3 include the (meth)acrylate polymers (A), including A-1, A-2, or A-3. A-1, A-2, or A-3 included in Comparative Examples 1 to 3 does not contain a (meth) acrylate group at an end group thereof. The resin composition of Comparative Example 4 does not include any (meth) acrylate polymer (A).

[Data about Materials in Tables 1 and Table 2]

Omnirad 819: Phenylbis(2,4,6-trimethylbenzoyl)phosphine oxide (manufactured by IGM Resins)

4-HBA: 4-Hydroxybutyl acrylate (manufactured by Osaka Organic Chemical Industry, Ltd.)

IDAA: Isodecyl acrylate (manufactured by Osaka Organic Chemical Industry Ltd.)

THF-A: Tetrahydrofurfuryl acrylate (manufactured by Kyoeisha Chemical Co., Ltd)

IBXA: Isobornyl acrylate (manufactured by Osaka Organic Chemical Industry Ltd.)

Viscoat #260: 1,9-Nonanediol diacrylate (manufactured by Osaka Organic Chemical Industry Ltd.)

UF-C051: Urethane acrylate (weight average molecular weight: 35,000, manufactured by Kyoeisha Chemical Co. Ltd.)

UN6304: Urethane acrylate (weight average molecular weight: 10,000, manufactured by Negami Chemical Industrial Co. Ltd.)

UV-3300B: Urethane acrylate (weight average molecular weight: 13,000, manufactured by Mitsubishi Chemical Co.)

UV-3700B: Urethane acrylate (weight average molecular weight: 33,000, manufactured by Mitsubishi Chemical Co.)

KE311: hydrogenated rosin ester (manufactured by Arakawa Chemical Industries, Ltd.)

3. Preparation of Adhesive Member (Test Specimen)

The above resin composition was applied on soda-lime glass (Central Glass Co., Ltd.) having a size of about 26 mm by 76 mm to a thickness of about 50 μm by using an inkjet printer (manufactured by MICROJET Co., Ltd.)

In the presence of oxygen, the soda-lime glass, on which the resin composition was applied, was irradiated with UV rays to be a light integral of about 220 $mJ/cm^2$ and about 380 $mJ/cm^2$ by using the UVLED lamp having peaks at about 405 nm and about 365 nm, respectively.

A PET film (TOYOBO CO. LTD., product name: A4360, thickness: 50 μm), which was cut into about 20 mm by 150 mm in advance, was bonded to the UV-irradiated soda-lime glass under a bonding pressure of about 0.15 MPa to obtain a test specimen.

Shear viscosities and storage moduli of the resin compositions of Examples and Comparative Examples and peel strengths of the adhesive members including the resin compositions were evaluated, and the results are listed in Table 3 below.

(Shear Viscosity Evaluation of Resin Composition)

The shear viscosity of the resin composition was measured at about 25° C. according to JIS Z8803. The shear viscosity of the resin composition was measured by using TVE-25L (manufactured by TOKISANGYO), a viscometer, under the speed condition of about 10 rpm.

(Storage Modulus Evaluation of Resin Composition)

A PET film (NP100A manufactured by Panac Co., Ltd.) which was subjected to release treatment by using the resin composition and a silicone rubber sheet (Tigers Polymer Corp.) having a hole of 8 mm in diameter were laminated on a slide glass (S1112 manufactured by Matsunami Glass) in this order. A blended curable liquid resin composition (28 μL) was dropped into the hole in the silicone rubber sheet and was irradiated with UV rays to be a light integral of about 220 mJ/cm$^2$ and about 380 mJ/cm$^2$ by using the UVLED lamp having peaks at about 405 nm and about 365 nm, respectively to obtain a measurement sample having a diameter of about 8 mm and a thickness of about 500 μm. The obtained measurement sample was measured by a dynamic rheometer (MCR302 manufactured by Anton Paar) to determine $T_g$ and tan δ of the cured product, and a storage modulus value was measured through these. The measurement conditions were a frequency of 1 Hz, a temperature range of −50° C. to 80° C., and a temperature increase rate of 2° C./min.

(Peel Strength Evaluation of Adhesive Member)

The peel strength of the adhesive member was measured using a universal testing machine (Instron 5965 manufactured by Instron Corporation) so that the peel angle of the test specimen was 180° at about 60° C. and a rate of about 300 mm/min. The peel strength was evaluated for the width of 25 mm by obtaining an average value of about 50 mm peeling and setting the average value to 1.25-fold.

Accordingly, when the adhesive member applied to the flexible display device is formed through the resin compositions of Examples, durability and folding characteristics may be improved.

Referring to Table 3, it may be seen that the resin compositions of Examples 1 to 5 have a shear viscosity in a range of about 8 mPa·s to about 50 mPa·s as measured at about 25° C. according to a JIS Z8803 method. Accordingly, when the resin composition according to an embodiment is provided by an inkjet printing method, the resin composition may be stably discharged and applied at a uniform thickness.

It may be seen that the adhesive member formed from the resin composition of each of Examples 1 to 5 has a 180° peel strength in a range of about 100 gf/25 mm to about 1,000 gf/25 mm at about 60° C. Accordingly, the adhesive member including the resin composition according to an embodiment may exhibit excellent adhesive reliability even in a humid heat environment.

Referring to Tables 2 and 3, Comparative Examples 1 to 3 do not include a (meth)acrylate group at an end group of the (meth)acrylate polymer (A), and Comparative Example 4 does not include any (meth)acrylate polymer (A). It may be seen that the adhesive members formed from the resin compositions of Comparative Examples 1 to 4 each have a 180° peel strength of less than about 100 gf/25 mm at about 60° C. It is thought that since the adhesive members formed from the resin compositions of Comparative Examples 1 to 4 do not include a (meth)acrylate group at the end group of the (meth)acrylate polymer (A), the adhesive members have low adhesion.

Comparative Examples 5 and 6 each include a (meth) acrylate group at an end group of the (meth)acrylate polymer (A), but have about 20 wt % or more of the (meth)acrylate (A) with respect to the total weight of the composition. It may be seen that the adhesive members formed from the resin compositions of Comparative Examples 5 and 6 each have a 180° peel strength of less than about 100 gf/25 mm at about 60° C. It is thought that since the adhesive members formed from the resin compositions of Comparative Examples 5 and 6 have about 20 wt % or more of the (meth)acrylate (A), the adhesive members have low adhesion. It may be seen that the resin composition of Comparative Example 6 has a shear viscosity of about 50 mPa·s or more as measured at about 25° C. according to a JIS Z8803 method. Since the resin composition of Comparative Example 6 has about 20 wt % or more of the (meth)acrylate polymer (A) and thus has a high viscosity, when the resin composition is provided by the inkjet printing method, the discharge stability may be lowered.

TABLE 3

| Material | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|
| Shear viscosity at about 25° C. [mPa · s] | 17 | 15 | 17 | 13 | 23 | 17 | 17 | 16 | 20 | 47 |
| 180° peel strength [gf/25 mm] | 150 | 120 | 120 | 110 | 200 | 20 | 15 | 30 | 10 | 90 |
| Storage modulus [MPa] | 0.17 | 0.14 | 0.13 | 0.11 | 0.19 | 0.15 | 0.11 | 0.25 | 0.22 | 0.31 |

Referring to Tables 1 and 3, in the cases of Examples 1 to 5, the (meth)acrylate (A) was included in an amount of about 1 wt % to about 20 wt %, the photoinitiator (B) was included in an amount of about 1 wt % to about 5 wt %, the (meth)acrylate monomer (C) was included in an amount of about 75 wt % to about 90 wt %, and the urethane (meth) acrylate oligomer (D) was included in an amount of about 1 wt % to about 20 wt %. Examples 1 to 5 each include a (meth)acrylate group at an end group of the (meth)acrylate (A). It may be confirmed that Examples 1 to 5 have excellent discharge characteristics when ink is provided, high adhesive reliability to a glass substrate, and excellent adhesive characteristics under repeated folding conditions through the resin composition including the material combination.

The resin composition according to an embodiment may include at least one (meth)acrylate polymer (A) including a (meth)acrylate group at the end group thereof and including a linear or branched alkyl group at a main chain or side chain, at least one photoinitiator (B), at least one (meth) acrylate monomer (C), and at least one urethane (meth) acrylate oligomer (D). In the resin composition according to an embodiment, an amount of the (meth)acrylate polymer (A) with respect to the total weight of the composition may be in a range of about 1 wt % to about 20 wt %. The resin composition according to an embodiment may have a shear viscosity in a range of about 8 mPa·s to about 50 mPa·s as measured at about 25° C. according to a JIS Z8803 method. Accordingly, the resin composition according to an embodiment may exhibit excellent discharge stability.

The display device according to an embodiment may include the adhesive member disposed between the display panel and the window. The adhesive member may include a polymer derived from the resin composition according to an embodiment. The adhesive member according to an embodiment may be formed by curing the resin composition according to an embodiment in the presence of oxygen. After photo-curing in the presence of oxygen, the resin composition according to an embodiment may have a 180° peel strength in a range of about 100 gf/25 mm to about 1,000 gf/25 mm at about 60° C. and about 90% humidity. Accordingly, the adhesive member according to an embodiment may exhibit excellent adhesive reliability even in a humid heat environment. After photo-curing in the presence of oxygen, the resin composition according to an embodiment may have a storage modulus in a range of about 0.01 MPa to about 0.2 MPa at about −20° ° C. Accordingly, the display device including the adhesive member according to an embodiment may exhibit excellent adhesive reliability even during the repeated operations such as folding/unfolding.

According to the above description, the resin composition according to an embodiment may have excellent discharge stability and excellent adhesive strength even when cured in the presence of oxygen.

The adhesive member according to an embodiment may have excellent adhesive strength even in a humid heat environment.

the display device according to an embodiment includes an adhesive member having excellent adhesive strength, and thus may have excellent reliability in various operations.

Embodiments have been disclosed herein, and although terms are employed, they are used and are to be interpreted in a generic and descriptive sense only and not for the purposes of limitation. In some instances, as would be apparent to one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the claims.

What is claimed is:

1. A resin composition comprising:

a (meth)acrylate polymer synthesized with a first monomer;

a photoinitiator;

a (meth)acrylate monomer containing a (meth)acryloyl group; and a urethane (meth)acrylate oligomer, wherein an end group of the (meth)acrylate polymer comprises a (meth)acrylate group, and the first monomer is represented by Formula 1:

[Formula 1]

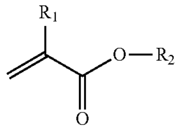

wherein in Formula 1, $R_1$ is a hydrogen atom or a substituted or unsubstituted methyl group, and $R_2$ is a substituted or unsubstituted linear alkyl group having 1 to 20 carbon atoms or a substituted or unsubstituted branched alkyl group having 1 to 20 carbon atoms.

2. The resin composition of claim 1, wherein in the Formula 1, $R_1$ is an unsubstituted methyl group, and $R_2$ is an unsubstituted methyl group, an unsubstituted 2-ethylhexyl group, or an unsubstituted dodecyl group.

3. The resin composition of claim 1, wherein the first monomer comprises methyl (meth)acrylate, 2-ethylhexyl (meth)acrylate, or dodecyl (meth)acrylate.

4. The resin composition of claim 1, wherein the (meth) acrylate polymer is synthesized with the first monomer and a second monomer that is different from the first monomer.

5. The resin composition of claim 4, wherein the first monomer comprises methyl (meth)acrylate, and the second monomer comprises 2-ethylhexyl (meth)acrylate or dodecyl (meth)acrylate.

6. The resin composition of claim 1, wherein the (meth) acrylate polymer has a weight average molecular weight in a range of about 4,000 to about 20,000.

7. The resin composition of claim 1, wherein an amount of the (meth)acrylate polymer is in a range of about 1 wt % to about 20 wt %, with respect to a total weight of the resin composition.

8. The resin composition of claim 1, wherein an amount of the photoinitiator is in a range of about 1 wt % to about 5 wt %, with respect to a total weight of the resin composition.

9. The resin composition of claim 1, wherein an amount of the (meth)acrylate monomer is in a range of about 75 wt % to about 90 wt %, with respect to a total weight of the resin composition.

10. The resin composition of claim 1, wherein an amount of the urethane (meth)acrylate oligomer is in a range of about 1 wt % to about 20 wt %, with respect to a total weight of the resin composition.

11. The resin composition of claim 1, wherein the resin composition has a shear viscosity in a range of about 8 mPa·s to about 50 mPa·s, at about 25° C.

12. The resin composition of claim 1, wherein the photoinitiator comprises a radical polymerization initiator.

13. The resin composition of claim 1, wherein the (meth) acrylate polymer has a weight average molecular weight in a range of about 4,000 to about 9,500.

14. A display device comprising:

a display panel;

a window disposed on the display panel; and an adhesive member disposed between the display panel and the window, wherein the adhesive member is derived from a resin composition, the resin composition comprises:

a (meth)acrylate polymer synthesized with a first monomer;

a photoinitiator;

a (meth)acrylate monomer containing a (meth)acryloyl group; and a urethane (meth)acrylate oligomer, an end group of the (meth)acrylate polymer includes a (meth)acrylate group, and the first monomer is represented by Formula 1:

[Formula 1]

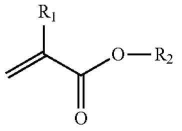

wherein in Formula 1, $R_1$ is a hydrogen atom or a substituted or unsubstituted methyl group, and $R_2$ is a substituted or unsubstituted linear alkyl group having 1 to 20 carbon atoms or a substituted or unsubstituted branched alkyl group having 1 to 20 carbon atoms.

15. The display device of claim 14, wherein the adhesive member is formed by:

directly providing the resin composition on a surface of the window or on a surface of the display panel, and UV curing the provided resin composition.

16. The display device of claim 14, further comprising:

an input sensing unit disposed on the display panel, wherein the adhesive member is disposed between the display panel and the input sensing unit or between the input sensing unit and the window.

* * * * *